United States Patent [19]

Sealy, Jr.

[11] Patent Number: 5,120,073
[45] Date of Patent: Jun. 9, 1992

[54] REMOVABLE TANGENTIAL/BICYCLE FENDERS

[76] Inventor: L. Taylor Sealy, Jr., 13702 Richmond #118, Houston, Tex. 77082

[21] Appl. No.: 640,586

[22] Filed: Jan. 14, 1991

Related U.S. Application Data

[63] Continuation-in-part of Ser. No. 434,810, Nov. 8, 1989, abandoned.

[51] Int. Cl.⁵ .............................................. B62J 15/02
[52] U.S. Cl. .................................. 280/152.1; 280/852
[58] Field of Search ............... 280/152.1, 152.2, 152.3, 280/852, 158.1, 160.1

[56] References Cited

U.S. PATENT DOCUMENTS

| | | | |
|---|---|---|---|
| 350,868 | 10/1886 | Copper | 280/152.1 |
| 558,938 | 4/1896 | Fletcher et al. | 280/152.2 |
| 582,173 | 5/1897 | Buckley | 224/39 R |
| 2,135,218 | 11/1938 | Pawsat | 280/152.1 |
| 4,243,241 | 1/1981 | Davis | 280/158.1 |
| 4,319,763 | 3/1982 | White | 280/152.3 |

FOREIGN PATENT DOCUMENTS

| | | | |
|---|---|---|---|
| 1108664 | 9/1981 | Canada | 280/152.3 |
| 0092030 | 10/1983 | European Pat. Off. | 280/152.1 |
| 915423 | 2/1954 | Fed. Rep. of Germany | 280/158.1 |
| 795885 | 3/1936 | France | 280/152.1 |
| 1158370 | 6/1958 | France | 280/158.1 |
| 2620102 | 3/1989 | France | 280/852 |
| 0156976 | 6/1978 | Netherlands | 280/852 |
| 0005086 | 7/1896 | Norway | 280/152.3 |
| 19730 | 9/1896 | United Kingdom | 280/152.1 |
| 20862 | of 1897 | United Kingdom | 280/152.3 |
| 4046 | of 1901 | United Kingdom | 280/152.1 |

OTHER PUBLICATIONS

"Acerbis" mountain bike fender and reviews from bike mags. Mountain Bike Action & Mountain & City Biking.
"Rack Mate & Splash Mate" fender from Bike Magazine 1990 Sport Cycling Bicycle Buyers Giude vol. 1.
"Backscratcher" Rear Fender ad from Mountain & City Biking Magazine Dec. 1990, pat. pending.
"Mirage Removable Spray Guard" from Bike Nashbar Catalog Holiday '90 Issue.
"Mounting Mudguards"—Bicycling Magazine, Oct.-Nov. 1989.

*Primary Examiner*—David M. Mitchell

[57] ABSTRACT

This fender system comprises three seprate fender elements (28,34,42) positioned to block mainly the tangential spray (22) that would hit the rider. There are two wheel mounted fenders (24,26) and an optional seat mounted one (28), all of which are easily removable. Each is constructed of an essentially flat strip, preferably of clear plastic, the seat one being flexible. They are positioned and oriented so as to block substantially all of the spray that would hit the rider and yet be of the smallest possible dimensions. Each wheel mounted fender element is supported preferably by a single ell-shaped support arm (40) with an attachment whose design depends on the bike design but which allows the fender to be quicklly removed in dry weather without tools. The preferred mounting method would be a quick-release bracket (58) that could be left in place when the fender was removed. It could be removed with the fender if the bike is equipped with a standard axle quick-release fitting. The bracket has a U-shaped bend at one end with holes to receive the support arm (40) end which is clamped with a thumbscrew (52). The other bracket end has a slot (54) to fit over the bike axle (56). The optional seat fender (28) is strapped to existing bike seat hanger eye (70) or other seat framework. The lower part of this fender element is secured to any rear bicycle reflector (30) by an opening (86) in the fender elemet (74) that slips over the reflector (30). This fender design is intended to provide a low-profile solution to road spray problems on bikes manufactured without fenders.

4 Claims, 2 Drawing Sheets

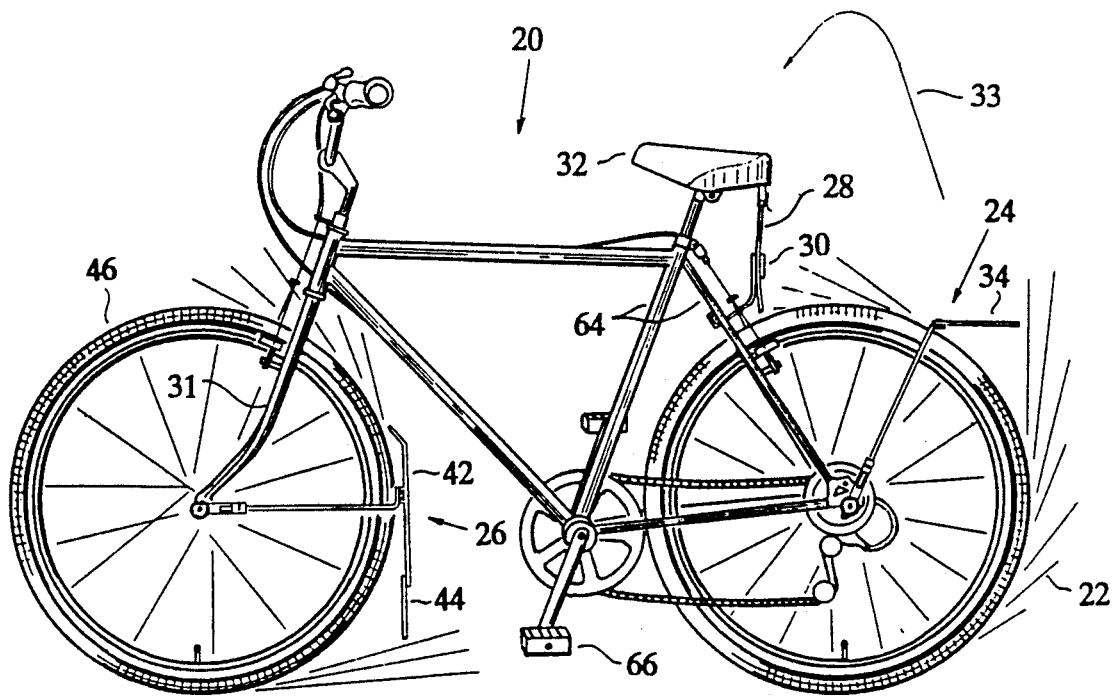
Figure 1
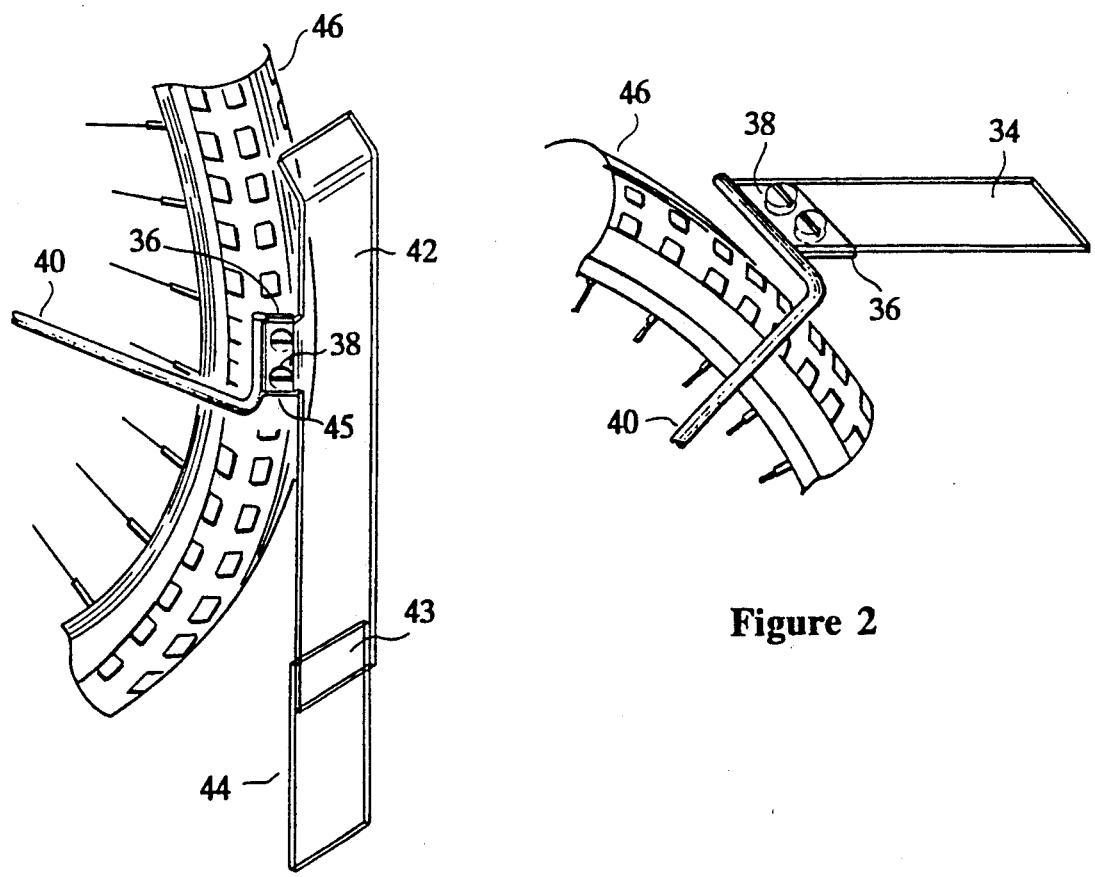
Figure 3
Figure 2

REMOVABLE TANGENTIAL/BICYCLE FENDERS

REFERENCE TO RELATED PATENT APPLICATION

This patent application is a continuation-in-part of my pending patent application Ser. No. 07/434,810, filed Nov. 8, 1989, entitled "Removable Tangential Bicycle Fenders," now abandoned.

BACKGROUND

1. Field of Invention

This invention has to do with splash guards or fenders as applied to bicycles in particular.

2. Description of Prior Art

It is currently popular, both for practical and aesthetic reasons, for bicycles not to have any type of wheel fenders. As mentioned in the prior art, this presents no difficulty under dry street conditions. If the bike is ridden on wet streets, however, both wheels will pick up water and mud an throw them on the rider. If the rider is wearing a rain suit the problem is less severe, but this suit may be hot and inconvenient and will not protect the face and hair. The streets may be wet long after the rain stops.

Conventional fenders generally cover a large portion of the wheel circumference and are installed more or less permanently due to the difficulty of installation. They also generally cover the wrong part of the wheel unless they cover almost all of it. Most fenders seem to be designed on the incorrect assumption that the spray leaves the wheel radially. White's extendable fender design in U.S. Pat. No. 4,319,763 would have to be greatly lengthened on both the front and back wheel in order to be effective. This is so since the spray leaves the wheel tangentially. This means the spray that hits the rider comes from the upper back end of the rear wheel and the lower back end of the front wheel. The extendable design just mentioned would become unwieldy, both structurally and from the point of view of beauty if it were lengthened.

All of the fenders may be analyzed for performance by drawing spray lines tangentially from the wheels to see which spray is blocked. All of the spray lines actually follow a parabolic trajectory with respect to the moving bicycle (neglecting wind resistance). But straight lines may be used as an approximation at most positions. The rear of the wheel is one exception. Spray from here is thrown up in the air which only hits the rider on the downward path.

Three other prior art fenders to be discussed so seem to grasp that the spray leaves the wheel tangentially, but still would not do the job of blocking the spray adequately. Two are from patent literature and one is on the market unpatented apparently.

The marketed fender just mentioned is available in at least two similar forms. By one company they are known as "Deflector Shields" and by another as "Splash Mate and Rack Mate". They consist of removable, flat plastic plates.

The rear ones only work on bikes with rear racks, which very few bikes have. They cover the top of the rack and block some of the rear wheel spray. However, since bike racks don't extend to the rear of the wheel, much of the wheel at an important area is left uncovered. Therefore, the rider will pick up a large amount of the rear wheel spray even with the plate in place.

The front plates attach to the down tube by the front wheel. They do not come close to blocking all the spray. On both brands the feet and lower legs are not protected nor is the face if it is near the handlebars. And the protection it does provide is only good while the wheel is more or less in a straight ahead position since the plates are attached to the frame and do not move with the wheel during turns. In order to do any good at all these plates have to be very large and since they are oriented almost square into the wind they may result in a significant wind resistance.

One of the mentioned patented (U.S. Pat. No. 4,243,241) but unmarketed fenders by Davis is just for the rear wheel. It consists of a flat plastic piece molded onto the hook-shaped end of a support arm. The plate is oriented radially in a plane perpendicular to the wheels. It is far too small to adequately protect the rider, but if it were large enough to do the job it could not be moved under the seat by pivoting as designed. It is oriented wrong to block the most spray with the least amount of fender. It also has material dragging on the tire in an attempt to remove mud and water. This is of questionable value and would increase bike riding resistance, particularly with mud. The clamped connection to a seat stay may not give enough resistance to rotation about the seat stay axis since many similar connections on bikes now slip readily.

One of the main ideas of Davis' splash guard is that it can be pivoted up under the seat during dry weather to make it unobtrusive. Some would question whether that action renders it much less noticeable.

The last of the patented but unworkable fenders mentioned is by Gruter (European patent announcement #83101278.6). This fender for front and rear consists of a short circular arc fender piece curved to follow the wheel and cupped in cross-section, which really looks like a piece cut off of a conventional bike fender. This is supported by a pair of hinged support arms with elastic clamp ends that attach to the seat stays or the front fork members.

Neither the front nor the rear fender are likely to work as shown. They are much too small to work properly in the configuration shown. It is even easy to see from the patent sketch itself that neither fender comes close to blocking all the spray that would hit the rider.

The rear one would have to be about twice as long in its present configuration to catch the spray from the rear of the wheel that would fly up in the air and then arc down onto the rider's back or even to block more direct spray that would hit the rider if he were shown sitting up in the sketch instead of hunched over.

The front fender is in even a worse situation as far as size. Its length would have to be nearly three times that shown in the patent sketch in the configuration shown in order to protect the rider. In the first place the bike pedal is shown higher and closer to the wheel than its worst case situation which is at the bottom of the stroke. So the fender would have to extend down almost under the wheel to protect the foot. This would be bad if the bike went over an obstruction such as a curb or through a pothole. The fender would be torn off. Since, as shown, it doesn't give spray protection from half way up the lower leg up to the face, it would have to be extended almost up to the closest point between wheel and frame downtube. This may be readily seen by drawing tangent lines from the wheel circumference to the rider as was done on the lower part of the wheel.

Both front and rear fenders would become too heavy and unwieldly, not to mention unsightly if they were increased to the true size needed to do the job in this configuration. It would be difficult to hold such a large, close-fitting fender in perfect alignment to keep from rubbing against the tire with only two support arms, especially with the snap-on frame connection. Furthermore, it is doubtful that the snap-on frame connection shown would support even the weight of the small fenders shown, with impact loading from bumps.

Even assuming that it did work it could not be installed and removed in seconds as claimed in the patent document. The patent sketch shows at least four screws which must be tightened to install each fender which also would seem to be require that tools be carried. Finally, this could not likely be used on off-road bicycles as it is too close to the ground in front to avoid obstructions and follows the wheel closely, as a conventional fender does, and so would clog with mud in muddy conditions.

One of the stated objectives of Gruter's fender is that the support arms may be folded up into the fender pieces, which may then be carried in the rider's pockets until needed. However, if the rider is going to have to carry them, it would seem much more convenient to carry them deployed on the bike rather than folded in the pockets. If it didn't look like rain they would likely be left at home instead of carried on the rider.

The history of bicycle fender design includes an array of fenders which look good but do not work. And no matter how good a fender looks it is of no use to a bicyclist if it doesn't work as claimed.

OBJECTS AND ADVANTAGES

Accordingly, several objects and advantages of this invention are to provide an effective, lightweight, easily removable fender that would be pleasing to the eye it is hoped and in fact not very visible at all due to the low profile design and the materials used. It is also simple to manufacture and therefore can be fairly inexpensive. These and other objects will become apparent from the following description of the preferred embodiment.

BRIEF DESCRIPTION

This fender system comprises three separate fender elements that may be used together or singly. They are positioned to block just the spray that would hit the rider. There are two wheel mounted fenders and an optional seat mounted one. The fender elements are constructed of flat, clear plastic strips in accordance with a design philosophy of make the fender as unnoticeable as possible. Designed to efficiently block spray leaving the wheels tangentially, the fenders may be much smaller than normal fenders. The rear one is placed at the upper back end of the rear wheel. The front one is placed at the lower rear portion of the front wheel. The seat fender extends from the seat down to near the wheel.

All of the fenders have quick-connect attachments so that they may be removed in dry weather like a raincoat. The wheel fenders are supported by single support arms attached through quick-release brackets to the bike axles. The bracket is intended to remain on the bike unless the bike is equipped with quick-release wheel attachments. The brackets allow adjustment for different tire diameters and also allow clearance adjustment for different riding conditions such as increased clearance to help prevent mud jamming in muddy conditions.

The seat fender, constructed of flexible plastic, attaches to existing bike seats with quick-release mounting straps and is also secured at the rear reflector. This seat fender is optional as the spray that it blocks would almost entirely pass between the rider's legs.

The advantages of this design may be understood in more detail by reference to the drawings as follows:

DESCRIPTION OF DRAWINGS

FIG. 1 is a view of the entire bicycle with all three fenders attached and showing the spray blocked by each.

FIG. 2 is a perspective view of the rear fender.

FIG. 3 is a perspective view of the front fender.

REFERENCE NUMERALS IN DRAWINGS

Figure 4:
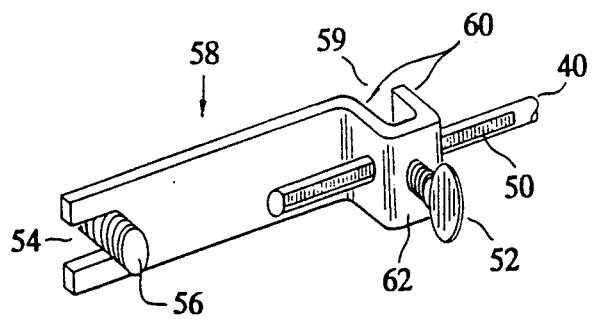
FIG. 4 is a perspective view of the preferred quick-release fender mounting bracket.

| | |
|---|---|
| 20 | Bicycle |
| 22 | Spray |
| 24 | Rear Fender (Assembly) |
| 26 | Front Fender (Assembly) |
| 28 | Seat Fender |
| 30 | Existing Rear Reflector |
| 31 | Front Fork |
| 32 | Seat |
| 33 | Parabolic Spray Trajectory |
| 34 | Rear Fender Element |
| 36 | Attachment Tab |
| 38 | Attachment Screw |
| 40 | Fender Support Arm |
| 42 | Front Fender Element |
| 43 | Lap Joint |
| 44 | Flexible Extension of Fender Element 42 |
| 45 | Attachment Ear |
| 46 | Tire |
| 48 | Alternative Quick-Release Mounting Bracket |
| 49 | Sleeve |
| 50 | Flat on Support Arm |
| 51 | Flat Extension |
| 52 | Thumbscrew |
| 54 | Attachment Slot |
| 56 | Bike Axle |
| 58 | Preferred Quick-Release Mounting Bracket |
| 59 | Opening of U |
| 60 | Legs of U |
| 62 | Bottom of U |
| 64 | Bicycle Framework |
| 66 | Pedal |
| 68 | Quick-Release Mounting Strap |
| 70 | Support Eyes |
| 76 | Reflector Support |
| 86 | Reflector Opening |
| 88 | Installation Slit |
| 90 | Attachment Slot |

DETAILED DESCRIPTION AND OPERATION OF INVENTION

The following basically describes the preferred embodiment with some references to alternatives. In the drawings, FIG. 1 shows an adult size bicycle 20 with the three fender assemblies attached—a rear wheel one 24, a front wheel one 26, and a seat one 28. Spray patterns 22 are shown to illustrate which spray is blocked by which fender. Notice that in this side view, the fenders present a very narrow profile which reduces its effect on the bike's appearance.

The rear fender element 34 is oriented and positioned to block all of the spray 22 which would be thrown onto the rider's back in its absence. It extends horizontally starting near to tire 46 at a position to intercept spray that would hit above the seat 32. This boundary is defined by a tangent line from the tire to the rear seat approximately. The fender element 34, also shown in FIG. 2, extends out approximately to an imaginary vertical line tangent to the rear tire 46 or slightly beyond. As stated previously, this stops not only the spray that would be thrown directly onto the rider's back but that which following a parabolic trajectory 33 would hit the rider from farther back on the wheel.

The rear fender element 34 need not be exactly horizontal to do its job. It is oriented horizontally in order to block all of the offending spray with a minimum of fender material. Even at an angle of 20° from the horizontal the fender element would only have to be 6% longer to block the same spray. However, at 30° it would have to be a significant 14% longer. It also starts to get too far from the spray origin if it is angled upward at this angle.

In hilly terrain the rear fender element 34 should really extend a little beyond the vertical tangent line. This is because in going down hills the fender, being attached to the bike frame is, in effect, rotated forward. This tends to uncover some of the rearmost spray paths. If the fender element 34 is a little longer to begin with, this does not occur.

In an alternative embodiment, the rear fender element 34 could even be curved along the wheel for a short portion like a piece of conventional fender and then it could end with a horizontal piece extending out to the vertical tangent line. This would cover the spray limits of concern without the excess fender that would be required to do the job that Gruter's curved piece would require, for example. The main factor is the beginning and ending points of the fender at the tangent line boundaries mentioned. The preferred embodiment accomplishes this simply with a minimum of material, and with maximum wheel clearance.

In FIG. 2 the rear fender element 34 is shown up close. It is constructed of a piece of clear, strong plastic such as polycarbonate. Clear plastic is chosen to aid in making the fender almost invisible, which is a desired object in this design. It is a flat piece approximately 0.31 cm ($\frac{1}{8}$") thick which is strong enough to support its weight and impact loads without any reinforcement. This gives it the low profile in side view just referred to and keeps low volume manufacturing cost down. This fender element 34 need only be about 15.2 cm (6") long on a normal size bike. In the preferred embodiment the fender element width would probably be slightly greater than the tire width. This would allow for misalignment, fender motion and spray divergence from the plane of the wheel. It is attached by screws 38 to the attachment tab 36 which is permanently attached to the horizontal leg of the support arm 40 by welding or other means. As an alternative to the attachment tab, the end of the support arm might be simply flattened to give a suitable mounting surface. The horizontal leg passes over the outside of the tire 46 without touching it. The screws 38 chosen to attach the fender elements for the ideal embodiment would be nylon screws. Nylon screws resist loosening due to vibration better. The ell-shaped support arm 40 may be about 0.625 cm ($\frac{1}{4}$") diameter. All metal parts unless noted, including the support arm 40, would be made from a structural grade of aluminum for lightness and strength. A single support arm 40 attached to the axle 56 on the left side of the bike is used for several reasons, although two arms may be used. The right rear axle connection is often inaccessible on bikes due to derailleur mounting and a single arm simplifies the design, reduces the cost and weight, simplifies installation and removal, and will do the job adequately. It doesn't touch the tire 46.

One advantage of radially mounting the fender support arm 40 to the wheel axle 56 is that vibrational movement of the fender elements 34, 42 due to support arm flexibility is in directions parallel to the outer tire surface. Therefore, tight clearance between the tire 46 and the fender elements 34, 42 may be obtained without rubbing occurring due to that motion.

The front fender element 42 is positioned to block all of the spray that would get on the rider from the front wheel. The front fender element 42, also shown in FIG. 3 with extension 44, extends vertically. The lowest portion blocks spray 22 from getting on the rider's feet and the bike drivetrain. It goes down approximately to a tangent line between the lower tire and a pedal in its lowest position. From there it extends high enough to catch all the spray that would hit the rider's body and face. The upper limit of the front fender element 42 is at a height about midway between the top of the wheel and the wheel centerline. The bend toward the tire at the position above wheel midheight is designed to protect the upper part of the rider's body which can be leaning forward above the handlebars. The fender element 42 only needs to come to within about 0.94 cm ($\frac{3}{8}$") of tire 46 to be entirely effective. It does not touch at any time. The upper part of fender element 42 could have been curved instead of having the sharp bend but the inventer believes this design to be simpler to fabricate, more unique, and it gives more tire clearance.

FIG. 3 shows a close-up view of the front fender element 42. The method of attachment of the fender element 42 to the support arm 40 is designed to provide maximum clearance with the rider's feet during turns when the front wheel is at its closest position to the pedal. On some bikes there is very little clearance between the rider's toes and the front tire 46. This clearance is as little as 0.64 cm ($\frac{1}{4}$") on many bikes. By bending an attachment ear 45 on the fender element 42 the thickness of the attachment is off to the side and the projecting heads on the screws 38 are out of reach of the rider's toes. The ear 45 is attached to the attachment tab 36 which is permanently connected to the end of the support arm 40 bent up into an ell-shape alongside the tire 46. As an alternative to the attachment tab, the end of the support arm might be simply flattened to give a suitable mounting surface. Otherwise, the attachment design is very similar to the rear fender's as shown in FIG. 2.

The front fender element 42 has a bend at the top to catch a specific portion of the spray 22. The bend shown in the drawing is about 45°. Any bend angle would work so long as the correct clearance is maintained at the top to block the spray. A 90° bend would work or even a curved upper portion. A 90° bend isn't preferred since it has a greater chance of catching on tires with a pronounced tread. The curved design isn't preferred since it is harder to fabricate and doesn't give as much tire clearance. Greater tire clearance is useful in preventing mud from clogging between the fender and tire.

The front fender element 42 has a flexible extension 44 on the lower end. This allows it to come in contact with a curb or other obstruction without damaging the fender since it is close to the ground. This extension would be constructed of clear, heavy, flexible vinyl in this case. The connection to the rigid portion of the fender element 42 is made with a lap joint 43 that is glued, screwed or attached by other means.

This flexible extension 44 may be made wider than the rest of the front fender element 42. A film of water often forms between the lower portion of the tire 46 and the ground. Crosswinds can catch this film and push spray around the side of the extension 44 in a way that is not possible with spray droplets alone. This is not a major problem but a wider flexible extension 44 will prevent it if necessary.

As an alternative embodiment of the front fender element 42 much of the upper fender could be curved to follow the wheel exactly like a piece of conventional fender and then leaving the wheel vertically on the lower portion. This would cover the spray limits of concern without the excess fender that would be required to do the job with Gruter's curved piece, for example. If flexible material is used on the lower part it can avoid the problem of the fender tearing off when going over obstructions that Gruter's fender would have. However, the preferred embodiment has several other advantages such as greater tire clearance and greater tolerance of misalignment.

The lightness of the front support arm 40 is especially important so it won't slip about the axle connection. The front support arm, being horizontal, has the full weight of the assembly with impact loading acting to cause rotational slippage at the axle. This is an additional reason for using an aluminum support structure.

The optional seat fender 28, also shown in FIG. 6, extends vertically downward from below the seat 32 to just above the tire 46. It blocks the spray 22 that would pass between the upper part of the rider's legs if they happen to be farther apart than the spray pattern, which is essentially in the plane of the wheel. This fender 28 is an optional fender since only a small amount of spray will get on the rider's legs from this section of the wheel. It is mostly a slight problem on the upper legs where they are both closer together and also farther from the point of origin of the spray on the tire. During turns and with crosswind the spray will tend to leave the plane of the wheel. The farther the target is from the point of origin of the spray the more the spray diverges from the centerline, and the more likely it is to get on the rider's legs in the absence of a fender here.

Figure 6:
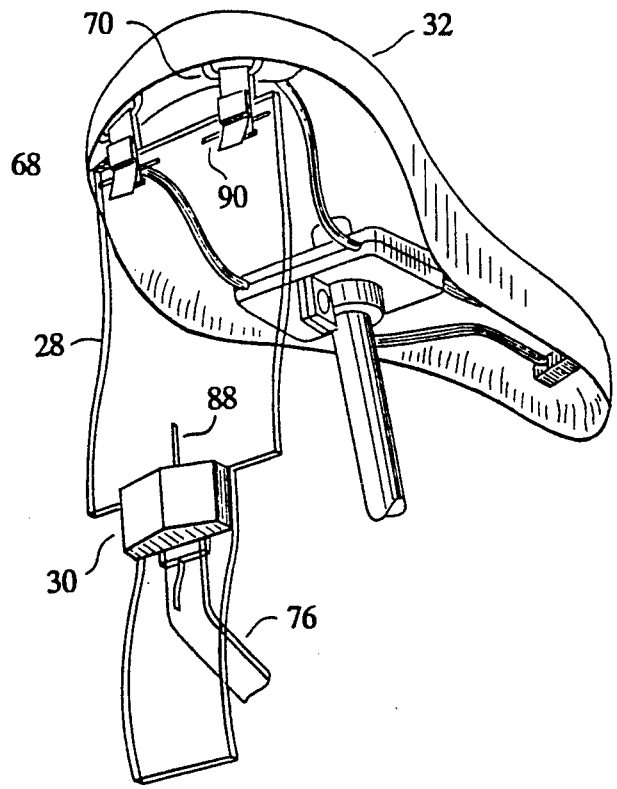
FIG. 6 is a perspective view of the seat fender attached to the existing seat and rear reflector.
Figure 7:
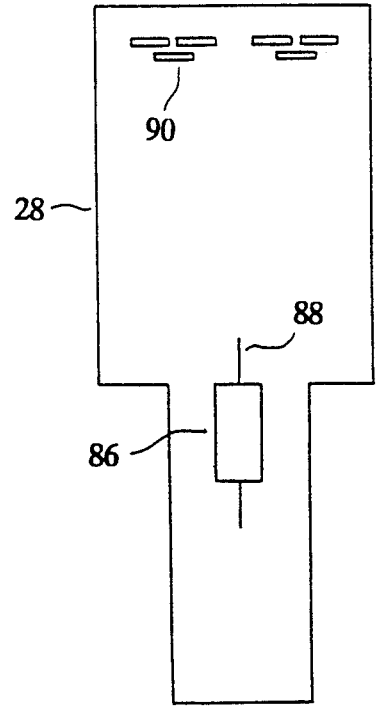
FIG. 7 is a rear view of the seat fender disconnected from the bike and without mounting straps.

The seat fender 28 in FIGS. 6 and 7 is adapted at top and bottom to existing bike hardware for support. At the top it is connected to any bike seat 32 and near the bottom it is connected to any rear reflector 30 to hold it in position. As described earlier it is an optional fender. It would ideally be made of the same heavy, flexible vinyl that the front fender extension 44 in FIG. 3 was made of. It would be clear as well.

The width of the seat fender 28 would be about the same width as the bike seat 32 at the top and would narrow to slightly larger than the bike tire 46 near the lower end. This puts extra width only where it is needed near the top. This part of the fender 28 blocks spray 22 from farther away on the wheel which has had more opportunity to diverge from the plane of the wheel in turns or due to crosswind. The lower, narrower part of the fender 28 blocks wheel spray 22 before it has traveled far from the tire 46 and therefore, has not had much chance to diverge from the wheel plane. Excess seat fender width can add unnecessary to wind resistance and poor appearance and therefore, is kept to a minimum. And, as stated the seat fender is optional since very little spray 22 from this source will get on the rider. Substantially all of the rear wheel spray that would get on the rider is blocked by the rear fender 24.

Mounting of the seat fender 28 would be facilitated by holes and cuts made in the vinyl. These are shown more clearly in FIG. 7.

It is envisioned that the top would be supported by conventional straps 68 and quick-release buckles run through fender slots 90 and then through existing support eyes 70 on the rear of many bike seats 32 or around other existing framework. This shown in FIG. 6. Multiple slots 90 are provided to allow for seat eye 70 spacing variations.

The lower end of the fender 28 would be held in place utilizing the reflector opening 86 with installation slits 88 shown in FIG. 7. How it is adapted to an existing reflector 30 is shown in FIG. 6. The opening 86 fits around the reflector support 76 with the fender 28 installed. The slits 88 allow opening 86 to open larger to fit over the reflector 30 during installation and removal.

For the rear and front fenders the preferred quick-release mounting bracket 58 is shown in FIG. 4. It allows the fender 24, 26 to be easily removed from the bicycle in dry weather without a tool. The bracket 58 would remain on the bike unless the bike was equipped with its own axle quick-release, in which case the entire fender assembly could be just as easily removed. The mounting bracket 58 is made of a flatbar shape bent into the form of a U at one end with the opening of the U 59 facing the wheel. A hole through the legs of the U 60 allows the support arm end to be received. A thumbscrew through the bottom of the U 61 secures the support arm end against axial and rotational motion by bearing on a flat 50 provided on the support arm end. The flat 50 provides added rotational resistance. This type of connection allows for length adjustment of the support arm to account for varying tire diameters and to vary tire clearance. Greater clearance may be provided for muddy conditions. Tighter clearance may be provided to avoid interference between the bike pedals and the front fender on turns. This is a problem on some bike models. The other end of the bracket 58 is slotted 54 to fit over the bike axle 56. The slot 54 allows it to be mounted without completely removing the axle nut or quick-release. It is secured against the bike frame with a nut or an axle quick-release.

This type of connection allows rotational adjustment in the plane of the wheel for positioning the fender. It also firmly secures the mounting bracket against unwanted movement out of the plane of the wheel. Fender position lateral adjustment is accomplished by bending of the mounting bracket. Serrations may be provided on the bracket surface against the frame to give added resistance to rotational slippage in the plane of the wheel. This bracket design serves its function very well and should be very easy and inexpensive to fabricate.

Figure 5:
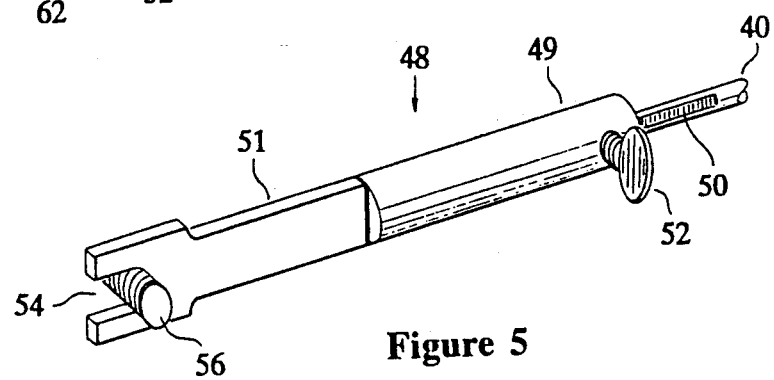
FIG. 5 is a perspective view of the alternative quick-release fender mounting bracket.

An alternative mounting bracket design 48 is shown in FIG. 5. It has basically all the operational features of the preferred design. It looks a little more substantial but is probably more expensive to make than the previous design. It also is a little heavier and longer than the above preferred design as may be seen by comparison of FIGS. 4 and 5. The sleeve 49 receives the end of the support arm 40. A thumbscrew 52 clamps the support arm 40 on a flat 50. A set screw may be substituted for the thumbscrew 52 if adjustment of the fender is to remain fixed, especially if the bike has axle quick-releases. This is true on the preferred embodiment in FIG. 4 also. The sleeve 49 is permanently attached to a flat extension 51 which has a slot 54 in its end to fit over the bicycle axle 56. It is secured against the bike frame with a nut or axle quick-release. The length of the flat extension 51 is necessary to clear the axle attachment area of the frame known as the "dropout" as may be seen in FIG. 1.

There are other alternative mounting bracket designs. One replacement for the preferred embodiment would be a fixed mounting bracket attached permanently to the support arm 40 end. It would have a flat end piece with a long slot to allow some adjustment of the fender at the axle.

Additional means of providing resistance to slippage of the bracket at the axle 56 may be provided in some situations such as on off-road bikes with severe impact loading, and particularly on the front fender. The front fender is heavier and has a horizontal support arm 40. Serrations built into the bracket at the axle should reduce slippage if the bracket material is steel. However, if it is aluminum the serrations will not be hard enough to bite into the steel bike frame surface at the connection to reduce slippage. The most common bike material is steel. In this case two possible solutions may be used. One is to use a steel flat washer with serrations on both sides. This would be put between the bike frame and the mounting bracket and would bite into each. Such washers with serrations on one side only are presently used at rear bike axles to help prevent axle slippage under loading from the drive chain. Another solution is to install a steel set screw through the mounting bracket to bite into the steel bike frame and give added rotational resistance to slippage.

If the fender design proves popular enough, an attachment may be provided by the bike manufacturer consisting of a sleeve directly attached to the bicycle framework or a larger fender mounting eyelet than currently exists to eliminate bolting to the axle as shown here.

Thus, the reader will see that the fender system of the invention provides a unique, effective, lightweight design which can be applied to a variety of bicycles. While my above description contains many specificities, these should not be construed as limitations on the scope of the invention, but rather as an exemplification of one preferred embodiment thereof. Many variations are possible. For example, the attachment brackets may be modified to account for different frame designs such as on some children's bikes. Or the wheel fender element may be made of aluminum or colored plastic instead of clear plastic. The width of the fender elements may be varied. The support arms don't have to be run to the axle. Plus other support and connection features may be changed. And so forth. Accordingly the scope of the invention be determined not by the embodiments illustrated, but by the appended claims and their legal equivalents.

I claim:

1. A rear fender for bicycles and the like of the type having front and rear mounted tires, wheels, and axles, a framework and a seat, said rear fender comprising:
    a. a planar fender element running only between the limits defined by the following end points plus or minus approximately one inch:
        1. a rear limit defined by a vertical line tangent to the rearmost point of the rear tire, and
        2. a forward limit defined by a rear tangent line between the rear tire and the top of the seat,
        said fender element departing from the wheel curvature and running approximately horizontal, and
    b. a single, ell shaped, radially adjustable support arm of circular cross section extending horizontally from a flat attachment portion at the fender element through ninety degree bend to a connecting means on the rear left side of the bicycle frame.

2. The bicycle fender of claim 1 where in the end of said support arm has a flat provided on the circumference of the end that mates with the connecting means, said connecting means comprising a flatbar shape bent into the form of a U at one end with the opening of the U facing the wheel such that a hole through the legs of the U will receive the support arm end a thumbscrew through the bottom of the U will secure said support arm end against axial and rotational motion by bearing on said flat, and said connecting means further including an open slot in the other end to fit over the bicycle axle and be clamped in place against the bicycle frame at the proper angle, whereby said connecting means becomes a quick-release connection whether or not the bike axle has an independent quick-release mechanism.

3. A front fender for bicycles and the like of the type having front and rear mounted tires, wheels, and axles, a front fork, and pedals, said front fender comprising:
    a. a bent, planar fender element running only between the limits defined by the following end points plus or minus approximately one inch:
        1. a lower limit defined by the lower tangent line running between the front tire and the pedal in its lowest position,
        2. an upper limit at a height midway between the axle and top of the front tire and forward of the rear of the front tire,
        said fender element departing from the wheel curvature and running approximately vertical, and
    b. a single, ell shaped, radially adjustable support arm of circular cross section extending vertically from a flat attachment portion at the fender element through a ninety degree bend parallel to the plane of the wheel to a connecting means on the left side of the bicycle front fork.

4. The bicycle fender of claim 3 wherein the end of said support arm has a flat provided on the circumference of the end that mates with the connecting means, said connecting means comprising a flatbar shape bent into the form of a U at one end with the opening of the U facing the wheel such that a hole through the legs of the U will receive the support arm end a thumbscrew through the bottom of the U will secure said support arm end against axial and rotational motion by bearing on said flat, and said connecting means further including an open slot in the other end to fit over the bicycle axle and be clamped in place against the bicycle frame at the proper angle, whereby said connecting means becomes a quick-release connection whether or not the bike axle has an independent quick-release mechanism.

* * * * *